H. F. LOVEJOY.

Mower.

No. 50,830.

Patented Nov. 7, 1865.

UNITED STATES PATENT OFFICE.

H. F. LOVEJOY, OF NINEVEH, NEW YORK.

IMPROVEMENT IN MOWING-MACHINES.

Specification forming part of Letters Patent No. 50,830, dated November 7, 1865.

*To all whom it may concern:*

Be it known that I, H. F. LOVEJOY, of Nineveh, in the county of Broome and State of New York, have invented a new and Improved Mowing-Machine; and I do hereby declare that the following is a full, clear, and exact description thereof, which will enable those skilled in the art to make and use the same, reference being had to the accompanying drawings, forming part of this specification, in which—

Figure 1:
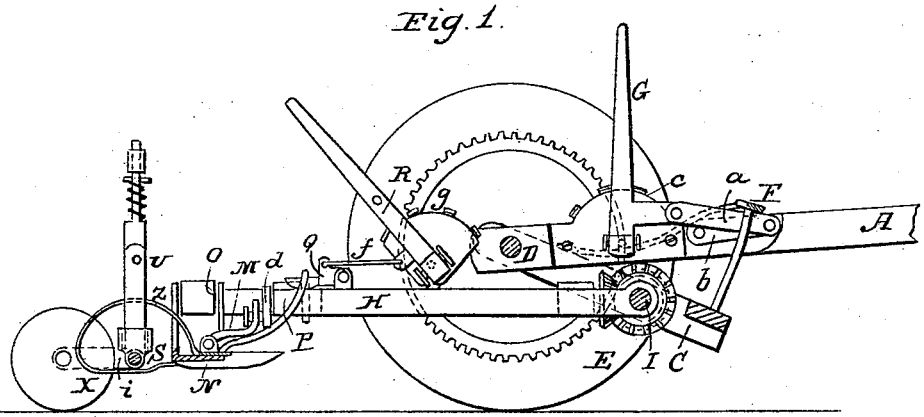
Figure 2:
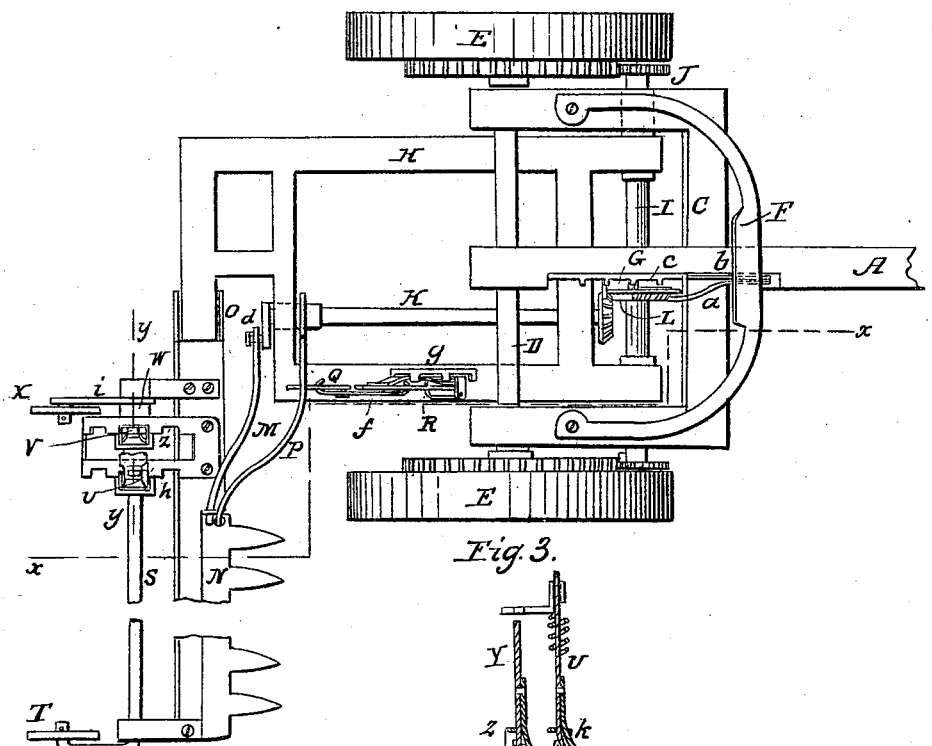
Figure 3:
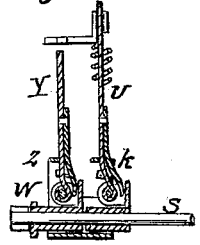

Figure 1 is a side sectional view of my invention, taken in the line $x\,x$, Fig. 2; Fig. 2, a plan or top view of the same; Fig. 3, a vertical section of a portion of the same, taken in the line $y\,y$, Fig. 2.

Similar letters of reference indicate corresponding parts.

This invention relates to a new and improved means for adjusting the finger-bar, whereby the same may be raised above the surface of the ground when not required for use—as, for instance, in turning the machine at the ends of a field or in transporting it from place to place—and also adjusted so that the sickle may cut higher or lower, as may be desired, and prevented from clogging up with cut grass—a contingency of quite frequent occurrence with the ordinary machines in use.

A represents the draft-pole of my improved mowing-machine, and C the main frame of the same; D, the axle, and E E the wheels. The axle D passes loosely through the rear part of the draft-pole and main frame, and to the upper surface of the latter there is attached a bow-shaped bar, F, which passes over the draft-pole.

G represents a lever, which is secured to one side of the draft-pole, and is connected by a link, $a$, to a bar, $b$, the lower end of which is also pivoted to the draft-pole, as shown clearly in Fig. 1. By adjusting the lever G the bar $b$ is actuated, and may be made to raise and lower the front part of the main frame in consequence of the bar F of the main frame resting upon it. The lever G may be retained at any point within the scope of its movement by means of a segment-rack, $c$, secured to the draft-pole.

H represents a supplemental frame, the front end of which is fitted loosely on a shaft, I, the latter passing transversely through the front part of the main frame C, and rotated by gearing J from the wheels E E. From the shaft I a shaft, K, is rotated by bevel-gears L, a crank, $d$, being on the rear end of said shaft, from which the sickle is driven by a pitman, M.

N is the finger-bar, which is connected to the rear end of the frame H by a joint, O, which is in line with the shaft K, thereby admitting of the finger-bar being raised and lowered without interfering with the sickle-driving mechanism.

P is a bar, one end of which is attached to the finger-bar N, and the opposite end fitted on a sleeve, $e$, on shaft K. This bar P extends over a lever, Q, on frame H, said lever Q being connected by a link, $f$, with a lever, R. By adjusting this lever R the lever Q will be actuated so as to bear or press upon the under side of bar P and raise the finger-bar and sickle.

The lever R may be retained at any desired point within the scope of its movement by means of a segment-rack, $g$.

At the rear of the finger-bar N there is a shaft, S, one end of which is bent in crank form, and has a wheel, T, upon it, said wheel being at the outer end of the finger-bar. The opposite end of the shaft S has a lever, U, attached to it, which is held in position by a segment-rack, $h$. On the shaft S, near the lever U, there is placed a loose collar, W, having an arm, $i$, attached, with a wheel, X, at its outer end. The collar W has a lever, Y, connected to it, which is held in position by a segment-rack, Z. By adjusting these levers either end of the finger-bar N may be raised or lowered, according to circumstances.

When the machine is drawn along and the sickle at work, in case the latter and the fingers should at any time become clogged with cut grass the driver simply backs the machine a short distance, which raises the points of the fingers of the bar N, and then on starting forward the fingers are lowered and will pass under the clods of grass.

I do not claim the hinging of the finger-bar N to the frame H in line with the sickle-driving shaft, for that has been previously done; but I do claim as new, and desire to secure by Letters Patent—

1. The bar F, attached to the main frame C, and passing over the draft-pole A, in connection with the lever G, link a, and bar b, and the supplemental frame H, all arranged as shown, for the temporary raising of the points of the fingers of bar N, for the purpose specified.

2. Elevating the finger-bar N by means of the bar P and levers Q R, arranged substantially as shown and described.

3. The shaft S, in connection with the wheels T X and levers U Y, arranged and applied to the finger-bar N to regulate the height of the cut of the sickle, substantially as described.

H. F. LOVEJOY. [L. S.]

Witnesses:
J. W. HOBBS,
GEO. W. HOBBS.